Jan. 22, 1963  N. S. ROBSON  3,074,509
CYCLIC LUBRICATING MEANS
Filed June 24, 1959  5 Sheets-Sheet 1

INVENTOR.
NORMAN S. ROBSON
BY
ATTORNEYS

Jan. 22, 1963 N. S. ROBSON 3,074,509
CYCLIC LUBRICATING MEANS
Filed June 24, 1959 5 Sheets-Sheet 2

INVENTOR.
NORMAN S. ROBSON
BY Ely, Pearne &
Gordon
ATTORNEYS

Jan. 22, 1963 N. S. ROBSON 3,074,509
CYCLIC LUBRICATING MEANS
Filed June 24, 1959 5 Sheets-Sheet 3

INVENTOR.
NORMAN S. ROBSON
BY Ely, Pearne & Gordon
ATTORNEYS

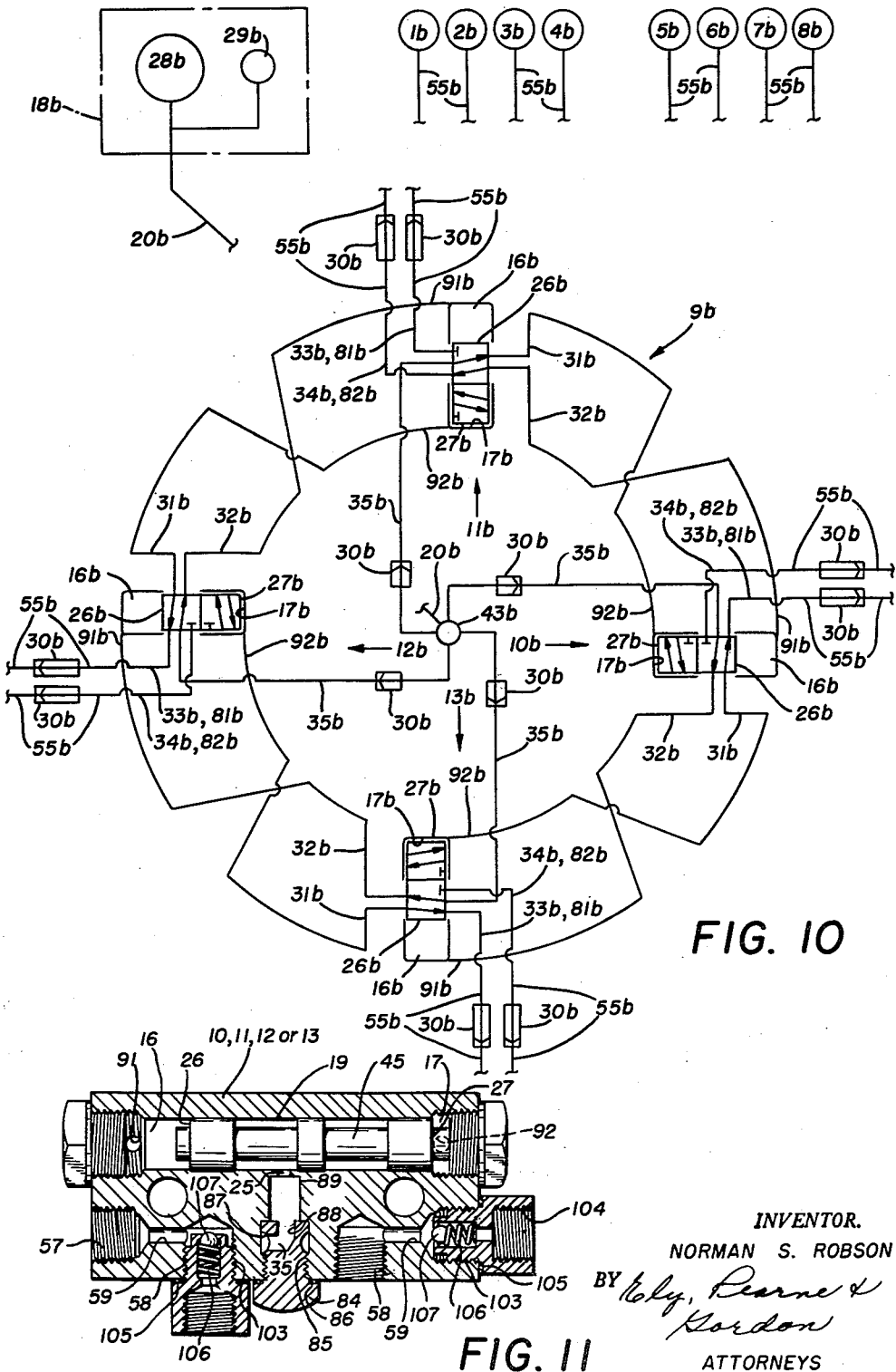

United States Patent Office

3,074,509
Patented Jan. 22, 1963

3,074,509
CYCLIC LUBRICATING MEANS
Norman S. Robson, Cleveland, Ohio, assignor to Trabon Engineering Corporation, Solon, Ohio, a corporation of Ohio
Filed June 24, 1959, Ser. No. 822,611
7 Claims. (Cl. 184—7)

This invention relates generally to lubricating systems and units thereof. More particularly, the invention relates to a lubricating system for supplying lubricant to several stations and proportioning the supply of lubricant between the several stations from a supply source, which supply source supplies lubricant to the system against varying back pressure so long as the back pressure does not exceed a maximum. This maximum may be imposed either by the inherent limitations of the supply source which may be such as to result in failure or stoppage when the maximum is exceeded, or more preferably it may be imposed by a pressure-responsive means such as a pressure-relief valve or pressure-responsive switch or the like. The pressure-reponsive means may optionally trigger automatic shutting down of the lubricating system or it may merely trigger signal means calling for manual shutting down of the lubricating system in the intended mode of operation of the system. The pressure-responsive means may merely relieve pressure without any signal or automatic shutting down of the system.

The invention contemplates the inclusion of one-way flow imposing means such as check valves or the like located downstream with respect to the fluid supply header of the distributor in such a manner as to define an on-stream conduit volume from the fluid supply header to each one-way flow imposing means which does not exceed the greatest total volume that occurs within the distributor for any one of the outlet branch passages thereof and any on-stream conduits associated therewith downstream of the header.

In another and important aspect, the invention contemplates the inclusion of one-way flow imposing means located downstream with respect to the fluid supply header of the distributor in such a manner as to continuously maintain a balance of the pressures at each end of the several valve-and-plunger units of the distributor.

The invention also contemplates the provision of flow divider assemblies which are themselves so organized that when they are used in a lubricating system the relationships mentioned in the preceding paragraphs will obtain. Furthermore, in one important aspect the invention contemplates modular flow divider sub-units or blocks which are of such construction and arrangement that when combined with other similar blocks and with suitable cap blocks they will result in flow divided assemblies of the above character.

Lubricating systems of the type to which the invention relates include a fluid distributor having a fluid supply header for receiving lubricant from the above-mentioned supply source and also include lines leading from the feeder to the several stations (such as bearings or the like, or subsidiary divisional feeders) which are to be supplied with lubricant. The invention contemplates fluid distributing systems employing cycling distributors. Such distributors include pluralities of pairs of hydraulic pistons and the design is such that incoming hydraulic flow can actuate only one pair of pistons in one direction at any given time and a succeeding pair of pistons can only move after the preceding pair has completed its predetermined stroke. Any desired number of piston pairs may be included in the distributor and, regardless of the number of pairs, the cyclic manner of operation may be maintained. The continuously cycling distributor has no given stopping or starting point but will continue to cycle as long as flow is maintained into the inlet portion.

Cycling distributors of the type contemplated are illustrated for example in U.S. Patent 2,792,911 and, for purposes of discussion below, systems contemplated by the present invention and using cycling distributors will be referred to as "cycling lubrication systems."

In centralized lubricating systems it is frequently highly advantageous from a cost standpoint to increase operating pressures to the highest practical maximum. The reasons for this are known to the industry and include reduction of conduit size and other factors. Consequently, a lubricating system which inherently becomes increasingly likely to malfunction as it is designed for higher and higher operating pressures is at a severe disadvantage in attempting to compete with other systems. This has been the case in cycling lubricating systems of the prior art. This invention overcomes or minimizes this disadvantage and thereby opens up many new applications for lubricating systems with continuously cycling divisional feeders.

The invention involves the concept of substantially eliminating potential backflow at the junctures of the fluid supply header with the several sub-circuits of the system by balancing the pressure on each member of each pair of hydraulic pistons of the distributor. In another important aspect of the invention there is involved the concept of minimizing backflow by means external to or at the surfaces of a distributor block assembly but arranged to define a back-flow potential as to sub-circuits or branches which is no greater than that which may be inherently imposed as to some of the sub-circuits by the character of the distributor assembly itself.

In the accompanying drawings:

FIGURES 9 and 10 are other abstracted schematic views illustrating the invention.

FIGURE 11 is a view similar to FIGURE 4, but showing other features of the invention.

Figure 1:
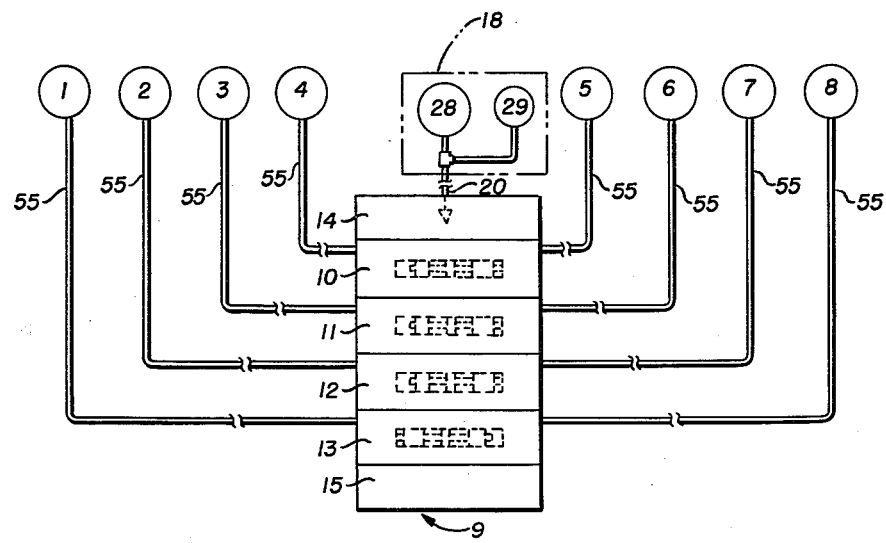
FIGURE 1 is a diagrammatic view of a lubricating system embodying the invention.
Figure 2:
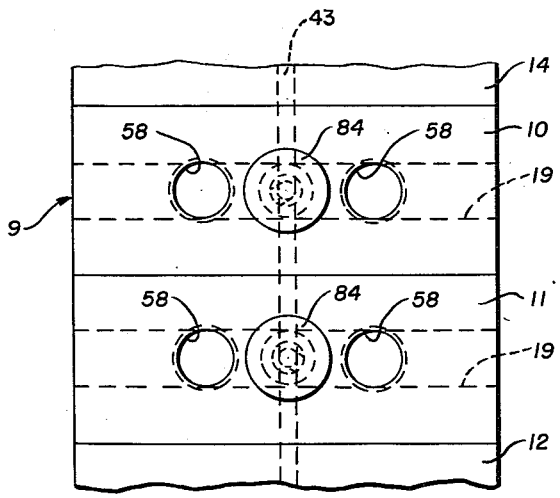
FIGURE 2 is a fragmentary side elevational view of the cycling distributor of FIGURE 1.

The illustrated lubricating system supplies lubricant to several stations 1–8 and proportions the supplied lubricant between the several stations from a supply source 18 (FIGURE 1) which may itself include a pump 28 actuated by a motor (not shown) and controlled by a pressure responsive switch 29 or the like which may trigger automatic shutting down of the lubricating system or may call for manual shutting down of the lubricating system in the intended mode of operation thereof. The supply source supplies lubricant to the system against varying back pressure so long as the back pressure does not exceed a maximum. Alternatively, the maximum may be defined merely by the inherent limitations of the supply source which may simply fail or stop when the designed pressure is exceeded, although this arrangement is rather rudimentary from a maintenance standpoint and would frequently be avoided. The pump may be actuated manually or by any suitable non-electrical means if desired.

The supply source 18 communicates through passage means 20 with a main fluid supply passage or fluid supply header 43. The system includes a cycling lubricant distributor 9 having a fluid supply header 43 which receives lubricant from the supply source 18. There are provided outlet branch lines 55 leading from the distributor 9 and communicating with the several stations 1-8. The distributor comprises a plurality of valve blocks or units 10-13 and two cap blocks including an inlet cap block 14 and an outlet cap block 15. The several blocks 10-15 may be assembled in side-by-side position by securing means such as long bolts or the like extending therethrough (not shown). It will be understood that a plurality of valve blocks may be used without any inherent top limit in the number of such valve blocks. It is not uncommon to employ scores of valve blocks.

The several stations 1-8 may comprise bearings to be lubricated or they may be subsidiary cycling lubricant distributors or the like.

It should be understood that the outlet branch lines 55 and the other conduits in the system may be of different sizes. The valve blocks or units 10-13 are shown as being substantially identical in construction and having cylinders and pistons of the same size, but it will be understood that the several blocks or units may have cylinders or pistons of different sizes; that is, they may have end chambers of different volumes to supply different quantities of lubricant to the several stations during each complete cycle of the distributor 9.

Figure 3:
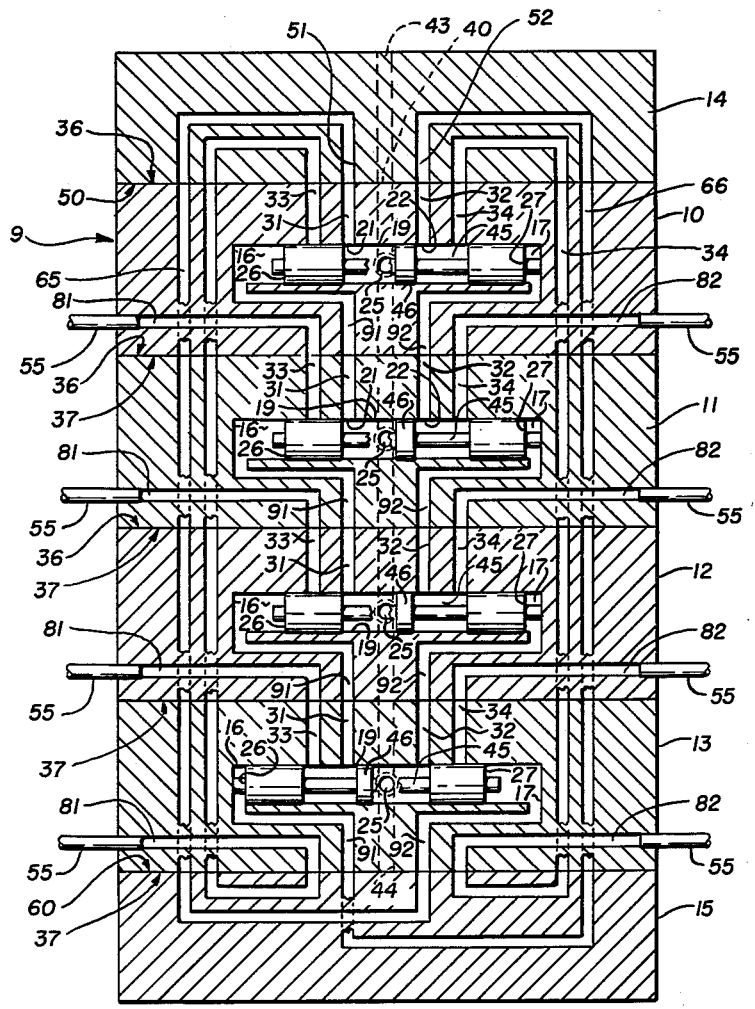
FIGURE 3 is a longitudinal sectional view of the cycling distributor of FIGURE 1 with the fluid passages therein shown schematically.
Figure 7:
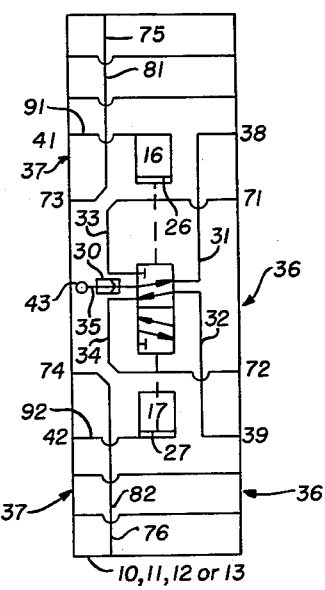
FIGURE 7 illustrates one of the blocks indicated in FIGURE 6 as removed from the remainder of the network.

Each valve block has formed therein a bore 19. Sliding in the bore 19 is valving and fluid ramming structure including a pair of endwise lobes, the endmost faces of which are indicated by the reference numerals 26 and 27 and which comprise hydraulic pistons linked for movement together through their central stem 45 and each defining with an endward portion of the bore 19 a piston chamber 16 or 17. Each of the pistons 26 and 27 functions in its own one of the pair of chambers 16, 17 in lubricating sealing sliding relationship therewith. Opening into the bore 19 are valve ports 21-25. The reciprocating linkage means 45 together with the longitudinally centerward portion of the endmost lobes and a central lobe 46 and the valve ports 21-25 constitute valve means which are such that when the linkage means moves to its first limiting position (which in the case of the valve ports in the illustration of FIGURE 3 is the rightward position) the valve ports 21 and 25 are interconnected and the valve ports 22 and 24 are interconnected, the valve port 23 being cut-off, and when a second limiting end position obtains (which in the case of the valve ports in the illustration of FIGURE 3 is the leftward position), the valve ports 21 and 23 are interconnected and the valve ports 22 and 25 are interconnected and the valve port 24 is cut-off. Each of the valve blocks has passages 31-35 communicating with the valve ports 21-25 respectively. Each valve block has first and second opposite faces 36 and 37 respectively for positioning against adjacent blocks in the cycling lubricant distributor 9. First and second piston chamber in-out ports 38 and 39, respectively, and a first main fluid supply port 40 are located on the face 36. Third and fourth piston chamber in-out ports 41 and 42 and a second main fluid supply port 44 are located on the second face 37. The main fluid supply passage or header 43 in each of the valve blocks 10-13 joins the first and second main fluid supply ports 40 and 44. The third piston chamber in-out port 41 of each valve block communicates with the first piston chamber 16 through a line 91 and is in register with an imaginary projection of the first piston chamber in-out port 38 which projection is made from the face 36 in which the in-out port 38 is located onto the second face 37. This will be clear from FIGURE 7 which shows an individual valve block or unit and the two faces 36 and 37 in question. It will be seen that a projection of port 38 is indeed in register with the port 41. It should be understood, however, that as used herein the term port includes grooves or other depressions or conformations on the face of the valve blocks which define wider mouths than those which result from the direct opening of a narrow passage at an acute angle onto the block face. The essential relationship contemplated by the relationship of being in register, in the sense presently used, is that of hydraulic or fluid communication between the passages in question. Thus it will be understood that surface grooves or the like of the general type disclosed in U.S. Patent No. 2,792,211 are fully within the contemplation of the invention as are other equivalent conformations. The fourth piston chamber in-out port 42 of each valve block communicates with the second piston chamber 17 through a line 92 and is in register with an imaginary projection of the second piston chamber in-out port 39 which projection is made from the face 36 in which the in-out port 39 is located onto the second face 37. This will also be clear from FIGURE 7. It will be seen that a projection of port 39 is indeed in register with the port 42.

The first and second passages 31 and 32 of each valve block communicate with the first and second piston chamber in-out ports of the block. The fifth valve port 25 of each block communicates with the main fluid supply passage or fluid supply header 43. The third and fourth passages 33 and 34 constitute outlet branch passages for guiding measures of lubricating fluid for discharge from the distributor, and constitute the upstream portion of the outlet branch lines 55.

The inlet cap block 14 has a first cap block face 50 for positioning against the first face 36 of one terminal one of the valve blocks 10-13, in the illustrated case the terminal valve block 10. First and second piston chamber in-out ports 51 and 52 are formed in the second cap block face 50 and have the same register as do the third and fourth piston chamber in-out ports 41 and 42, respectively, on each of the valve blocks 10-13. The other of the cap blocks, namely the end block 15 in the illustration, has a second cap block face 60 for positioning against the second face 37 of the remaining terminal one of the valve blocks, which happens to be the valve block 13 in the illustration. First and second piston chamber in-out ports 61 and 62, respectively, are formed in the second cap block face 60 and have the same register, respectively, as do the first and second piston chamber in-out ports 38 and 39 on each of the valve blocks or units 10-13.

Provided on the first face 36 of each of the valve blocks or units 10-13 are first and second outlet ports 71 and 72. Provided on the second face 37 of each of the valve blocks or units 10-13 are third and fourth outlet ports 73 and 74. Opening on a face other than the face 36 or 37 are fifth and sixth outlet ports 75 and 76. The first outlet port 71 of each valve block or unit 10-13 communicates with the third passage 33 of its associated valve block or unit and is in register with an imaginary projection of such third outlet port 73 onto the first face 36. The second outlet port 72 of each valve block or unit 10-13 communicates with the fourth passage 34 associated with each valve block or unit 10-13 and is in register with an imaginary projection of the fourth outlet port 74 onto the first face 36. These relationships may be seen to obtain most clearly by an examination of FIGURE 7.

A first outlet branch passage extension 81 associated with each valve block or unit 10-13 joins the third and fifth outlet ports 73 and 75 of the particular valve block or unit 10–13. A second outlet branch passage extension 82 of each valve block or unit 10–13 joins the fourth and sixth outlet ports 74 and 76 of that valve block or unit.

It will be understood that the outlet ports 75 and 76 and the outlet branch passage extensions 81 and 82 may be alternatively located in various faces other than the faces 36 and 37 and the arrangements may be provided whereby this location may be varied in the field. Thus, there may be provided pairs of threaded outlets 57 and 58 (FIGURE 4) for end or side connection to the outlet branch lines 55, these two pairs of threaded outlets each being in communication with and forming part of the outlet branch passage extension 81 or 82 and being joined together through a short passage 59. One opening of each pair 57, 58 is plugged, preferably by a plug which will be ruptured by a predetermined maximum lubricant pressure. The other opening of the pair is connected to its outlet branch line 55.

Figure 6:
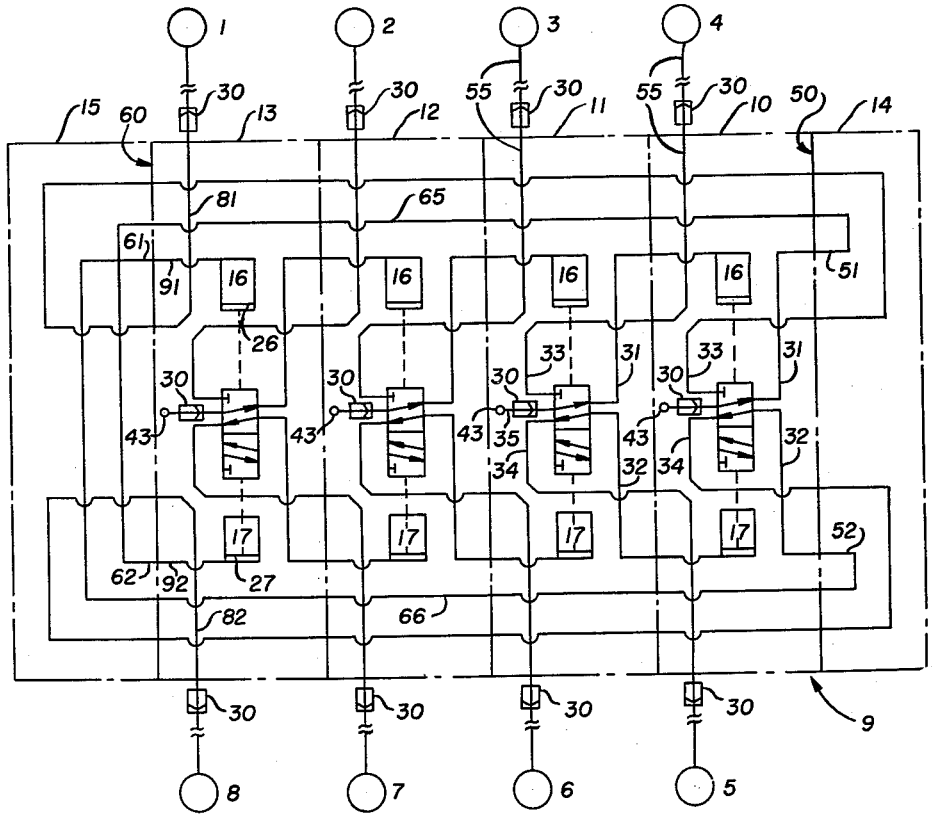
FIGURE 6 is an abstracted schematic view illustrating the invention.
Figures 8, 8A:
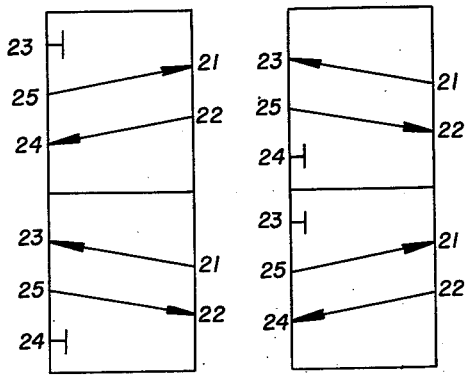
FIGURE 8 is an enlarged diagrammatic representation of the porting of one of the valves as indicated in FIGURE 6.
FIGURE 8A is a representation similar to FIGURE 8 but showing a differently arranged porting scheme.

In order to in effect "close the circle" of the cyclic fluid network, the cap blocks 14 and 15 and the intervening valving block or units 10–13 are provided with suitable auxiliary passage means so that the port 51 in the inlet cap block 14 substitutes for one of the ports 41 and the port 52 in the inlet cap block 14 substitutes for one of the ports 42 and so that the port 61 in the end cap block 15 substitutes for one of the ports 38 and the port 62 in the end cap block 15 substitutes for one of the ports 39. Thus, between the ports 71 and 72, respectively, on the first endmost valve block 10 and the ports 73 and 74, respectively, on the other endmost valve block 13 extend passages which include ports in the two cap blocks 14 and 15 and laterally outward conduits in the blocks 10–13, all in a manner which will be made apparent from FIGURES 3 and 6. Also between ports 38 and 39, respectively, on the face 36 of the first endmost valve block 10 and the ports 42 and 41, respectively, on the face 37 of the other endmost valve block extend the passages 65 and 66. It is to be noted that this last joinder involves crossing of the passages 65 and 66 so that the port 38 of the block 10 joins the port 42 rather than the port 41 of the block 13, and the port 39 of the block 10 joins the port 41 rather than the port 42 of the block 13. This cross-over of the passages is desirable in order that the valving arrangments of valves may all be similar in construction and arrangement, if not identical because of varying sizes. Of course, they may all be identical if appropriate. In some important broad aspects of the invention, however, it is to be understood that other equivalent networks may be employed involving other configurations but involving, nevertheless, the basic principle of cyclic lubrication. For example, a reverse arrangement of valve porting or other equivalent variants may be employed. That is, one or more of the valves may be arranged, unlike those illustrated in FIGURES 3 and 6, so that the port 25 is joined to the port 21 or 22 when the chamber 16 or 17 remote from such port 21 or 22 is filled. This could be accomplished for example by using a four lobe valve in the same bores shown in FIGURE 3. A plurality of such four lobe valves are shown for example in FIGURE 17 of U.S. Patent 2,792,911. The functional representation of such a valve is shown in FIGURE 8A. By way of example, if two of the functionl valve representations as shown in FIGURE 8A are substituted for two of the functional valve representations as shown in FIGURE 6, the result will be a cycling lubrication system. However if only one is substituted, the resulting system will not cycle endlessly.

In the particular configuration shown in FIGURES 3 and 6, and starting in the position of the parts illustrated in FIGURE 6, incoming fluid at the main fluid supply passage or fluid supply header 43 is admitted through the fifth passage 35 of the block 10 and subsequently through the fifth and first valve ports 25 and 21 and then through the first passage 31 in the block 10 and then through the first piston chamber in-out port 51 and through passage means 65 and the second piston chamber in-out port 62 of the second cap block face 60 and through the second in-out line 92 to the unfilled second hydraulic piston chamber 17 of the block 13. Pressure against the hydraulic piston 27 forces this piston in the chamber-expansion direction and mechanically forces the associated piston 26 in a direction to force fluid out of the first hydraulic piston chamber 16 of the block 13; such forced-out fluid is forced through the means 91 of the block 13, 61 of block 15, 52 of block 14, 32 of block 10, interconnected valve ports 22 and 24 of block 10, means 34 of block 10, and thence to the second outlet branch passage extension 82 of block 13 and to the outlet branch line 55 (FIGURE 1) which is fed by such means 82.

The movement of the hydraulic pistons of block 13 shifts the valve porting and causes the valve ports to be interconnected as shown in the lower schematic portion of FIGURE 8.

When the piston 27 has moved to the limit of its travel, the second hydraulic piston chamber 17 can accept no more fluid, but at this stage the ports of the associated valving elements become interconnected as schematically indicated in the lower portion of FIGURE 8. Accordingly, fluid fed in through the fifth passage 35 of the block 13 can now pass to the unfilled chamber 17 of block 12. The associated piston 27 is thereby forced upwardly and the chamber 16 is correspondingly emptied through the line 91 of the block 12 (see FIGURE 7), first passage 31 of block 13, ports 21 and 23 of block 13 (now interconnected as shown in the lower portion of FIGURE 8), third passage 33 of block 13, first outlet branch passage extension 81 of block 12 to the outlet branch line 55 fed thereby.

As the chamber 17 of block 12 is filled, the fifth passage 35 of block 12 becomes ported to the chamber 17 of block 11 whereupon this chamber is filled and corresponding chamber 16 is emptied back through now-interconnected ports 21 and 23, valve 12 and to the first outlet branch passage extension 81 of block 11 and the outlet branch line 55 fed thereby.

As the chamber 17 of block 11 becomes filled, fifth passage 35 of block 11 becomes connected to unfilled chamber 17 of block 10 and this chamber fills causing chamber 16 of block 10 to empty through now-interconnected ports 21 and 23 associated with the block 11 and thence through first outlet branch passage extension 81 of block 10.

As chamber 17 of block 10 becomes filled, fifth passage 35 of block 10 becomes interconnected through element 32 of block 10 and element 52 of block 15 and through passage means 66 and element 91 of block 13 to now-emptied chamber 16 of block 13. This chamber fills causing now-filled chamber 17 of block 13 to empty through element 92 of block 13, element 62 of block 15, passage means 65 of element 51 of block 14, element 31 of block 10, now-interconnected ports 21 and 23 associated with block 10, element 33 of block 10, first outlet branch passage extension 81 of block 13 and the branch line 55 fed thereby.

As chamber 16 of block 13 becomes filled, the associated valving means moves to the position illustrated in FIGURE 6 and the fifth passage 35 of block 13 becomes connected in feeding relationship to chamber 16 of block 12. As chamber 16 of block 12 fills, chamber 17 empties through now-interconected ports 22 and 24 associated with block 13 and thence through the second outlet branch passage extension 82 of block 12.

As chamber 16 of block 12 becomes filled, the fifth passage 35 of block 12 becomes connected in feeding relationship to chamber 16 of block 11 and as such chamber becomes filled, chamber 17 of block 11 empties through now-interconnected valve ports 22 and 24 associated with block 12 to second outlet branch passage extension 82 of block 11 and then to the associated outlet branch line 55.

As chamber 16 of block 11 becomes filled, fifth passage 35 of block 11 becomes connected in feeding relationship to chamber 16 of block 10 and as this chamber fills, chamber 17 of block 10 empties through now-interconnected ports 22 and 24 associated with block 11 and thence to the second outlet branch passage extension 82 of block 10 and to the outlet branch line 55 fed thereby.

As chamber 16 becomes filled, the fifth passage 35 of block 10 becomes connected to now-unfilled chamber 17 of block 13 to start the operation of a succeeding cycle of operation.

Figure 9:
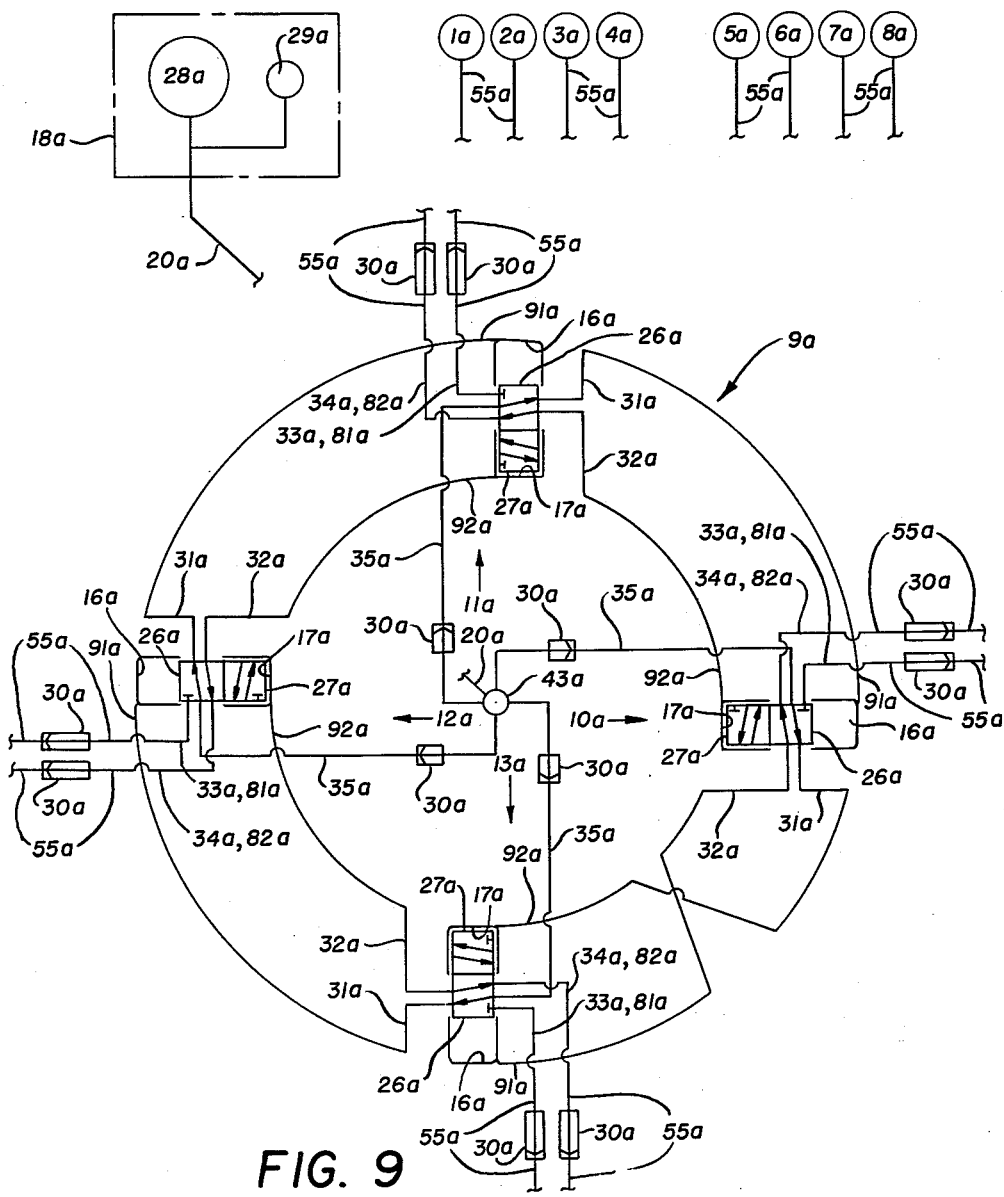

One of the environmental settings for the invention in its broader aspects is illustrated in FIGURE 9. Here the valves and conduits of the previously described srtucture are illustrated in an array which is literally circular. In each instance, identical or equivalent elements in this illustration of the invention are given the same reference numeral as those previously used with the addition of the letter "a." Thus, there is shown a lubricating system for supplying lubricant to several stations 1a–8a and proportioning the supply of lubricant between the several stations from the supply source 18a. The system includes passage means 20a and a cycling lubricant distributor 9a having a supply header 43a which receives lubricant through the passage means 20a.

Also shown are outlet branch lines 55a leading out of the distributor 9a and communicating with the several stations 1a–8a. The distributor 9a includes a plurality of valve blocks or units equivalent to those previously described, each unit having first and second hydraulic piston chambers 16a and 17a and a pair of hydraulic pistons 26a and 27a, which in the representational scheme of FIGURE 9 are represented themselves merely by the piston-chamber-defining face of the blocks which illustrate the valve porting. Each of the hydraulic pistons 26a and 27a is in lubricant-sealing sliding relationship on its own one of the pair of chambers 16a and 17a. The valving unit is illustrated generally by the reference numerals 10a, 11a, 12a and 13a. Each unit may include valve structure identical to that previously described and will thus be understood to include linkage means for linking its pair of hydraulic pistons 26a, 27a for movement together and in hydraulic opposition to each other back and forth between first and second limiting end positions. Each unit also has valve means including valve ports 21a–25a. In a first limiting end condition (which happens to be the radially inward position of each of the units as they are seen in FIGURE 9), the first and fifth valve ports 21a and 25a are interconnected and the second and fourth valve ports 22a and 24a are interconnected and the third valve port 23a is blocked-off. In the second limiting end position of the valves, their first and third valve ports 21a and 23a are interconnected and the second and fifth valve ports 22a and 25a are interconected and the fourth valve port 24a is blocked off. Obviously, the interconnections which obtain in each limiting end position obtain only for that position and do not obtain in the opposite limiting end position.

Each unit 10a–13a has first, second, third and fourth passages 31a–34a, respectively, communicating with its first, second, third and fourth valve ports 21a–24a, respectively. Frst and second in-out lines 91a and 92a in each unit communicate with the first and second piston chambers 16a and 17a respectively. The third and fourth passages 33a and 34a of each unit constitute outlet branch passages for guiding the measures of lubricating fluid for discharge from the distributor network and constitute the upstream end of the outlet branch lines 55a. The fluid supply header 43a may communicate directly with each of the fifth valve ports 25a or as shown it may communicate therewith through a fifth valve branch passage 35a. In this connection it should be mentioned also that in some aspects of the invention and particularly with respect to the structure illustrated in the preceding drawings, the main fluid supply passage or fluid supply header 43 may intersect the bores 19 so that there is no separate fifth passage 35 associated with each of the valve blocks, but rather the headers 43 communicate directly with the fifth valve ports 25 which themselves may, therefore, each constitute a pair of openings on opposite sides of the bore 19.

In the distributor network shown in FIGURE 9, when the parts are in the illustrated position, fluid admitted from the main fluid supply passage or fluid supply header 43a will feed through the fifth passage 35a of the distributor unit 10a which is connected to the now-unfilled chamber 17a of the unit 13a. As chamber 17a of unit 13a fills, chamber 16a of unit 13a empties through lines 34a and 82a of unit 10a.

As chamber 17a of unit 13a becomes filled, line 35a of unit 13a becomes connected to now-unfilled chamber 17a of unit 12a. As chamber 17a of unit 12a fills, chamber 16a of unit 12a empties through elements 33a and 81a of unit 13a and the branch line 55a associated therewith.

As chamber 17a of unit 12a becomes completely filled, line 35a of unit 12a becomes connected to now-unfilled chamber 17a of unit 11a. As chamber 17a of unit 11a fills, chamber 16a of unit 11a empties through lines 33a, 81a of unit 12a and thence to the outlet branch line 55a supplied thereby.

As chamber 17a of unit 11a becomes completely filled, line 35a of unit 11a becomes connected to now-unfilled chamber 17a of unit 10a. As chamber 17a of unit 10a fills, chamber 16a of unit 10a empties through elements 33a and 81a of unit 11a and the outlet branch passage 55a fed thereby.

As chamber 17a of unit 10a becomes completely filled, line 35a of unit 10a becomes connected to now-unfilled chamber 16a of unit 13a. As chamber 16a of unit 13a fills, chamber 17a of unit 13a empties through lines 33a and 81a of unit 10a and the branch line 55a supplied thereby.

As the chamber 16a of unit 13a becomes filled, line 35a of unit 13a becomes connected to now-unfilled chamber 16a of unit 12a. As chamber 16a of unit 12a fills, chamber 17a of unit 12a empties through elements 34a, 82a of unit 13a to the branch line 55a supplied thereby.

As chamber 16a of unit 12a becomes filled, line 35a of unit 12a becomes connected to now-unfilled chamber 16a of unit 11a. As chamber 16a of unit 11a fills, chamber 17a of unit 11a empties through lines 34a, 82a of unit 12a.

As chamber 16a of unit 11a becomes completely filled, line 35a of unit 11a becomes connected to now-unfilled chamber 16a of unit 10a. As chamber 16a of unit 10a becomes filled, chamber 17a of unit 10a empties through lines 34a and 82a of unit 11a.

As chamber 16a of unit 10a becomes completely filled, line 35a of unit 10a becomes connected to chamber 17a of unit 13a, and a new cycle of operation commences.

Another environmental setting for the invention in its broader aspects is illustrated in FIGURE 10.

Here again the valves and conduits of the previously described structure are illustrated in an array which is literally circular. In this case, identical or equivalent elements are given the same reference numeral as those previously used with the addition of the letter "b." Thus, there is shown a lubricating system for supplying lubricant to several stations 1b–8b and proportioning the supply of lubricant between the several stations from the supply source 18b. The system includes passage means 20b and a cycling lubricant distributor 9b having a supply header 43b which receives lubricant through the passage means 20b.

Also shown are outlet branch lines 55b leading out of the distributor 9b and communicating with the several stations 1b–8b. The distributor 9b includes a plurality of valve blocks or units equivalent to those previously described, each unit having first and second hydraulic piston chamber 16b and 17b and a pair of hydraulic pistons 26b and 27b, which in the representational scheme of FIGURE 10 are represented themselves merely by the piston-chamber-defining face of the blocks which illustrate the valve porting. Each of the hydraulic pistons 26b and 27b is in lubricant-sealing sliding relationship on its own one of the pair of chambers 16b and 17b. The valving unit is illustrated generally by the reference numerals 10b, 11b, 12b and 13b. Each unit may include valve structure identical or similar to that previously described. The valve structure of the top unit will be understood to include linkage means for linking its pair of hydraulic pistons 26b, 27b for movement together and in hydraulic opposition to each other back and forth between first and second limiting end positions. Each unit also has valve means including valve ports 21b–25b. In a first limiting end condition (not necessarily the radially inward position of each of the units as they are seen in FIGURE 10), the first and fifth valve ports 21b and 25b are interconnected and the second and fourth valve ports 22b and 24b are interconnected and the third valve port 23b is blocked-off. In the second limiting end position of the valves, their first and third valve ports 21b and 23b are interconnected and the second and fifth valve ports 22b and 25b are interconnected and the fourth valve port 24b is blocked off. Obviously, the interconnections which obtain in each limiting end position obtain only for that position and do not obtain in the opposite limiting end positions.

Each unit 10b–13b has first, second, third and fourth passages 31b–34b, respectively, communicating with its first, second, third and fourth valve ports 21b–24b, respectively. First and second in-out lines 91b and 92b in each unit communicate with the first and second piston chambers 16b and 17b respectively. The third and fourth passages 33b and 34b of each unit constitute outlet branch passages for guiding the measures of lubricating fluid for discharge from the distributor network and constitute the upstream end of the outlet branch lines 55b. The fluid supply header 43b may communicate directly with each of the fifth valve ports 25b or as shown it may communicate therewith through a fifth valve branch passage 35b.

In the distributors shown in FIGURES 9 and 10, the pair of first and second passages 31a and 32a (or 31b and 32b) of each unit is connected with its own pair of in-out lines comprising the first and second in-out lines 91a and 92a (or 91b and 92b) of another unit, with a given number of the connected pairs of such passages 31a, 32a (or 31b, 32b) and in-out lines 91a, 92a (or 91b, 92b) having the first passages 31a (or 31b) connected to the first in-out lines 91a (or 91b) and the scond passage 32a (or 32b) connected to the second in-out line 92a (or 92b). In FIGURE 9 this given number is only three rather than four due to the one cross-over connection indicated in the lower right-hand quadrant of the figure. In FIGURE 10, this given number is zero due to the cross-over connections indicated in all four quadrants of the figure. Any remaining number of such connected pairs of the passages 31a, 32a (or 31b, 32b) and in-out lines 91a, 92a (or 91b, 92b) are connected in the opposite manner, as at the one cross-over connection in FIGURE 9 and the four cross-over connections in FIGURE 10. Thus, such remaining number will be understood to be one for FIGURE 9 and four for FIGURE 10.

A given number of the valve means are formed to alternately port their first and second valve ports 21a, 22a (or 21b, 22b) to their fifth valve port 25a (or 25b) when the one of their first and second piston chambers 16a, 17a (or 16b, 17b) closest to their first and second valve ports 21a, 22a (or 21b, 22b) is filled. Any remaining number of the valve means is oppositely arranged to alternately port their first and second valve port to their fifth valve port when the one of their first and second piston chambers 16a, 17a (or 16b, 17b) furthest from their first and second valve ports is filled. Such given number of valve means in the device of FIGURE 9 includes all four valve means, and therefore the remaining number of such valve means in the device of this figure is zero. In the apparatus of FIGURE 10 however, all the valves are oppositely arranged from those of FIGURE 9 except for the top valve means which is identical to the valves of FIGURE 9. Accordingly, it will be understood that for FIGURE 10 the given number of valve means is one and the remaining number of valve means is three.

FIGURES 9 and 10 illustrate two possible combinations. In any event it is important that the sum of such remaining numbers of connected pairs and such remaining numbers of valve means equal an odd number.

Since such remaining number of connected pairs is one in FIGURE 9 (and also in FIGURE 3) and such remaining number of valve means is zero in FIGURE 9 (and also in FIGURE 3), it will be understood that the total of such remaining numbers of connected pairs and valve means equals one in the device of FIGURE 9 (and also of FIGURE 3). Since such remaining number of connected pairs is four in FIGURE 10 and such remaining number of valve means is three in FIGURE 10, the total of such remaining numbers of connected pairs and valve means equals seven in the device of FIGURE 10, and therefore is seen to equal an odd number.

Other arrangements are possible, the unit functioning as an endless cycling unit so long as such total of the remaining number of connected pairs and valve means equals an odd number. Thus for example, if all the crossed connections were eliminated in the apparatus of FIGURE 10, it would still function as an endless cycling unit for the reason that the total of the remaining numbers of connected pairs (which would then be zero) and valve means (which would remain three) would be equal to three, an odd number.

In the distributor network shown in FIGURE 10, when the parts are in the illustrated position, fluid admitted from the main fluid supply passage or fluid supply header 34b will feed through the fifth passage 35b of the distributor unit 11b which is connected to the now-unfilled chamber 17b of the unit 10b. As chamber 17b of unit 10b fills, chamber 16b of unit 10b empties through lines 34b and 82b of unit 10b.

As chamber 17b of unit 10b becomes filled, line 35b of unit 10b becomes connected to now-unfilled chamber 17b of unit 13b. As chamber 17b of unit 13b fills, chamber 16b of unit 13b empties through elements 34b and 82b of unit 10b and the branch line 55b associated therewith.

As chamber 17b of unit 13b becomes completely filled, line 35b of unit 13b becomes connected to now-unfilled chamber 17b of unit 12b. As chamber 17b of unit 12b fills, chamber 16b of unit 12b empties through lines 34b, 82b of unit 13b and thence to the outlet branch line 55b supplied thereby.

As chamber 17b of unit 12b becomes completely filled, line 35b of unit 12b becomes connected to now-unfilled chamber 17b of unit 11b. As chamber 17b of unit 11b fills, chamber 16b of unit 11b empties through elements 34b and 83b of unit 12b and the outlet branch passage 55b fed thereby.

As chamber 17b of unit 11b becomes completely filled, line 35b of unit 11b becomes connected to now-unfilled chamber 16b of unit 10b. As chamber 16b of unit 10b fills, chamber 17b of unit 10b empties through lines 33b and 81b of unit 10b and the branch line 55b supplied thereby.

As the chamber 16b of unit 10b becomes filled, line 35b of unit 10b becomes connected to now-unfilled chamber 16b of unit 13b. As chamber 16b of unit 13b fills, chamber 17b of unit 13b empties through elements 33b, 81b of unit 10b to the branch line 55b supplied thereby.

As chamber 16b of unit 13b becomes filled, line 35b of unit 13b becomes connected to now-unfilled chamber 16b of unit 12b. As chamber 16b of unit 12b fills, chamber 17b of unit 12b empties through lines 33b, 81b of unit 13b.

As chamber 16b of unit 12b becomes completely filled, line 35b of unit 12b becomes connected to now-unfilled chamber 16b of unit 11b. As chamber 16b of unit 11b becomes filled, chamber 17b of unit 11b empties through lines 33b and 81b of unit 12b.

As chamber 16b of unit 11b becomes completely filled, line 35b of unit 11b becomes connected to chamber 17b of unit 10b, and a new cycle of operation commences.

According to the present invention there are presented potential back flows to the fluid supply headers 43 or 43a which are much lower than in the case of prior cycling lubricating systems with continuously cycling feeders, including those systems which may have employed one-way flow imposing means at various locations within the fluid network.

In this connection, the lines 55, 55a and 55b are shown as having inserted therein one-way flow imposing means such as check valves or the like indicated by the reference numeral 30, 30a and 30b. This check valve or other flow imposing means may comprise any conventional hydraulic units such as ball check valves or the like and appropriate check valves will be described in greater detail below.

As used below "on-stream conduits" will be understood to be those conduits through which flow is intended to be in one given direction (e.g. passages 33, 34 and 35) as distinguished from off-stream conduits through which flow is intended to reverse in direction (e.g. passages 31, 32). "On-stream conduit volume" will be understood to be the fluid volume of "on-stream conduits," as above defined.

According to the invention, one-way flow imposing means are associated with the outlet branch lines 55, 55a or 55b. The one-way flow imposing means of each outlet branch line is so located downstream with respect to the fluid supply header 43, 43a or 43b that between itself and the fluid supply header there is an on-stream conduit volume which does not exceed a given volume. Such given volume is the greatest total volume that occurs within the distributor 9, 9a or 9b for any one of the third and fourth passages 33 and 34 (or 33a and 34a, 33b and 34b) together with any on-stream conduits (associated valving chamber within bore 19, and conduit 35; or equivalent associated valving chamber within the bore of valve means in devices of FIGURES 9 and 10, and conduits 35a or 35b) associated with such third or fourth passage downstream of the header and within the distributor.

Thus for example in the apparatus of FIGURES 3 and 6 the greatest total volume (assuming the various conduit cross-sections and the diameters of the bores 19 and stems 45 to be constant from block to block) would be that of the inlet 35 in unit 10 plus line 33 of the unit 10 and the associated valve chamber in the unit 10 (the valving chamber to the left of the central lobe 46 as viewed in FIGURE 3) together with the communicating conduits extending through the caps 14 and 15 and also including the outlet branch passage extension 81 in the unit 13. Because the units are symmetrical in the particular structure under discussion, such greatest total volume would also be that of the inlet 35 in unit 10 plus line 34 of the unit 10 and the associated valve chamber in the unit 10 (the valving chamber to the right of the central lobe 46 as viewed in FIGURE 3) together with the communicating conduits extending through the caps 14 and 15 and also including the outlet branch passage extension 82 in the unit 13. The greatest total volume as described above will thus be understood to be that of the on-stream conduits supplying the outlet branch lines which lead to stations 1 and 8 (see FIGURE 6).

The one-way flow imposing means 30, associated with the remaining branch lines which supply the stations 2-7, are therefore located so as to define from themselves to the fluid supply header 43 an on-stream conduit volume which is less than or which at least does not exceed such greatest total volume. If for example the one-way flow imposing means 30 are located immediately adjacent the outlet ports 75 and 76 (FIGURE 7) of each block or unit 10-12, there will be between each of them and the fluid supply header an on-stream conduit volume considerably less than such greatest total volume, which greatest total volume may be regarded as that identified with an inherent minimum potential backflow at the header 43 which obtains if no check valves are employed within the distributor 9 no matter what arrangement of check valves are employed exteriorly of the distributor 9. In order to cause such minimum potential backflow to obtain in fact, it will be desirable to employ a check valve or other one-way flow imposing means 30 adjacent the outlet ports 75 and 76 of the block 13.

One important aspect of the invention involves the substantial elimination of potential backflow at the header 43 by employing one-way flow imposing means between the header 43 and the several fifth valve ports 25, as by locating check valves 30 within the passages 35. Each such one-way flow imposing means is of course associated with two rather than one of the outlet branch lines 55 but comes well within the broad concept of defining from itself to the header 43 an on-stream conduit volume less than such greatest total volume discussed in the preceding paragraphs, since the on-stream conduit volume it defines is necessarily less than the volume of the line 35 in which it is located. Such location of one-way flow imposing means eliminates potential back flow by eliminating all possibility of unwanted discharge from a chamber 16 or 17 to header 43 in response to back pressure on the opposed chamber 16 or 17 from an outlet branch passage connected therewith.

Such location of one-way flow imposing means maintains a balance of the pressures on each member 26 and 27 of the piston pairs 26, 27, since the pressure imposed on any given outlet branch line by forcing fluid from the particular piston chamber 16 or 17 which directly feeds such outlet branch line is necessarily generated also within the hydraulic piston chamber 16 or 17 into which fluid from the header is fed during the feeding of the outlet branch line in question, and the same generated pressure will remain trapped in both of these particular chambers 16 and 17 upon the cycling of the system past the phase where such forcing of fluid from such particular piston 26 or 27 is called for.

Thus for example even the pressure of a sizable and highly compressed air bubble located within passage means 66 in FIGURE 3 could not cause the pistons 26 and 27 of the block 13 to move to the right even when the parts reach the position shown (where valve port 25 of block 13 becomes connected to unfilled chamber 17 of block 12) and even if the bearing which has just been fed through the outlet branch passage extension 82 of block 13 requires extremely high pressure (whereby fluid under extremely high pressure is within the passage means 66 and is inherently capable of considerable expansion without rapid falling off of said high pressure due to the presence of said highly compressed air bubble) and furthermore even if the bearing fed through the outlet branch passage extension 81 of block 12 requires very little pressure (whereby little pressure will be demanded to fill chamber 17 of block 12 and pressure in the fluid supply header 43 will thereby be momentarily relieved).

The above observations are pertinent for systems operating at extremely high pressures even when there is no air bubble, as such, so long as the fluid itself is compressible to any significant degree, as are many or most lubricating fluids.

Figure 4:
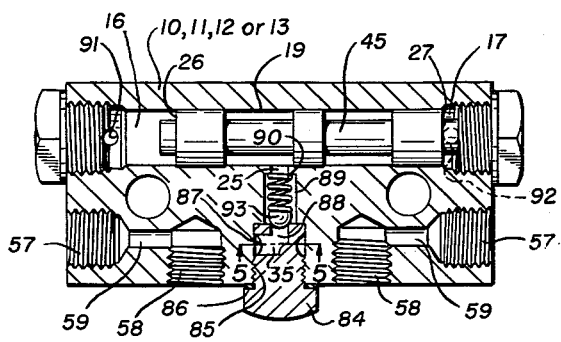
FIGURE 4 is a transverse sectional view of the feeder of FIGURE 3, the illustration showing a structural embodiment rather than a diagrammatic representation.
Figure 5:
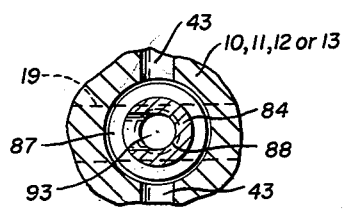
FIGURE 5 is a fragmentary sectional detail view on an enlarged scale taken on line 5—5 of FIGURE 4.

A suitable one-way flow imposing means for the inlet passages 35 is shown in FIGURES 3–5. A plug 84 is received in a threaded recess 85 communicating with the passage 35. A head gasket 86 may be provided. A peripheral groove 87 formed in the plug 84 communicates with a central hole 88. A recess portion 89 of the passage 35 has located within itself a spring 90 which urges a ball 93 against the seat formed by the end of the plug 84. The groove 87 directly communicates with the header 43, as shown in FIGURE 5.

It will be understood that such optimum location of the one-way flow imposing means 30 may not be possible in some instances as for example when the header 43 intersects the bores 19.

A suitable one-way flow imposing means for location other than between the supply header and the inlet valve port 35 is illustrated in FIGURE 11. Here there is shown a check valve fitting, a plurality of which may be threadedly received in those of the threaded outlets 57 and 58 which are not blocked off but are to be connected to the outlet branch lines. Each fitting may comprise a threaded boss 103 which is threadedly receivable in an outlet 57 or 58 and also a tapped bore 104 forming a threaded outlet for additional downstream elements. A sealing gasket 105 may be provided. A spring 106 is provided together with a ball 107 receivable against a seat formed as by swaging within the body of the fitting, as illustrated. It would be within the contemplation of some aspects of the present invention to employ for example a number of such fittings in association with outlet branch lines while eliminating the ball checks 93 (as by simply failing to include them and their associated springs 90 in the assembly of the device) associated with the same branch lines in upstream relation thereto, as illustrated in FIGURE 11.

Valves employing the ball checks 93 and also those employing the ball checks 107 will be understood to exemplify one-way flow imposing means 30, 30a or 30b as represented in FIGURES 6, 9, and 10 respectively. Other equivalent one-way flow defining valves or devices may be employed. In FIGURES 6, 9 and 10 the one-way flow imposing means 30, 30a and 30b are illustrated both in position between the header and the fifth valve port and also in position downstream of the third and fourth valve ports. Such arrangements will function satisfactorily but any outlet branch lines which have the former located on-stream and upstream with respect to such branch lines will by also having the latter associated therewith gain only a certain added margin of safety against complete failure of one-way flow imposing action as to any given outlet branch line due to malfunctioning of check valves. Since this may not be a significant advantage the latter one-way flow imposing means may be omitted as to any outlet branch lines which have the former one-way flow imposing means associated therewith. Conversely in the broader aspects of the invention which do not contemplate complete elimination of backflow potential at the junctures of the header with several branch subcircuits, the former one-way flow imposing means may be employed and the latter omitted. Of course this is not feasible if complete elimination of potential backflow is critically important, as it may be for extremely high pressures and large distributor assemblies.

The smallest volume of the end chambers 16 and 17 may be conveniently defined in part by enlarged tapped sections at the ends of the bores 19 which receive plugs 68 and also by the amount of endwise extension of the stems 45 beyond the end lobes, in a manner which will be clear from the drawings.

This application is a continuation-in-part application with respect to my copending application Serial No. 610,340 filed September 17, 1956, now abandoned, and all portions of the disclosure thereof are specifically adapted by reference to the extent, if any, that they may not have been explicitly set forth hereinabove. The aforesaid copending application Serial No. 610,340 has been abandoned in favor of the present application.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

In the usage of the following claims, if a means is recited as downstream with respect to a passage, the relationship between the means and passage is such that any fluid which reaches the means must first flow within the passage. If a means is recited as on-stream with respect to a passage or station, the relationship between the means and passage or station is such that all fluid which flows within the passage or to the station must also flow past the means. If a means is recited as upstream with respect to a station, the relationship between the means and station is such that any fluid which reaches the station must first flow past the means.

What is claimed is:

1. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a fluid supply header for receiving lubricant from said supply source, outlet branch lines leading out of said distributor and communicating with said several stations, said distributor comprising a plurality of valve-and-plunger units, each unit having first and second hydraulic piston chambers and a pair of hydraulic pistons each in its own one of said pair of chambers in lubricant sealing sliding relationship with its said own one of said pair of chambers, each said unit including linkage means for linking its said pair of hydraulic pistons for movement together and in hydraulic opposition to each other back and forth between first and second limiting end positions, each said unit also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said unit having first, second, third and fourth passages communicating with its said first, second, third and fourth valve ports, respectively, first and second in-out lines in each said unit communicating with said first and second piston chambers, respectively, said third and fourth passages constituting the upstream portions of outlet branch passages for guiding measures of lubricating fluid for discharge from said distributor to said outlet branch lines, said fluid-supply header communicating with each of said fifth valve ports, each of the pairs of passages comprising said first and second passages of each unit being connected with its own pair of in-out lines comprising said first and second in-out lines of another unit, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve ports to their said fifth valve port when the one of their said first and second piston chambers closest to their said first and second valve ports is filled, any remaining number of said valve means being oppositely arranged, the total of said remaining numbers of connected pairs and valve means equalling an odd number, one-way flow imposing means on-stream with respect to said outlet branch lines, said one-way flow imposing means being located downstream with respect to said fluid supply header and defining from themselves to said fluid supply header an on-stream conduit volume which does not exceed the greatest total volume that occurs within the distributor for any one of said third and fourth passages together with any on-stream conduits associated therewith downstream of the header and within the distributor and said one-way flow imposing means being thus located both on-stream and remotely upstream with respect to stations which are remote from said lubricant distributor, so that backflow into the distributor from the outlet branch lines is substantially eliminated.

2. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a main fluid supply passage for reeciving lubricant from said supply source, outlet branch lines leading out of said distributor and communicating with said several stations, said distributor comprising a plurality of valve blocks and two cap blocks, each valve block having first and second hydraulic piston chambers and a pair of hydraulic pistons each in its own one of said pair of chambers in lubricant sealing sliding relationship with its said own one of said pair of chambers, each said valve block including linkage means for linking its said pair of hydraulic pistons for movement together and in hydraulic opposition to each other back and forth between first and second limiting end positons, each said valve block also including valve means associated for movement with said linkage means, first, second, third, fourth and fifth valve ports associated with each of said valve means, said first and fifth valve ports being interconnected and said second and fourth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said valve block having first, second, third and fourth valve ports, respectively, each said valve block having first and second opposite faces for positioning against adjacent blocks in said lubricant distributor, first and second piston chamber in-out ports and a first main fluid supply port on said first face, third and fourth piston chamber in-out ports and a second main fluid supply port on said second face, a main fluid supply passage in said each valve block joining said first and second main fluid supply ports, said third piston chamber in-out port of said each valve block communicating with said first piston chamber and being in register with an imaginary projection of said first piston chamber in-out port onto said second face, said fourth piston chamber in-out port of said each valve block communicating with said second piston chamber and being in register with an imaginary projection of said second piston chamber in-out port onto said second face, said first and second passages of said each valve block communicating with the said first and second piston chamber in-out ports respectively of said each valve block, said fifth valve port communicating with said main fluid supply passage, said third and fourth passages constituting the upstream portions of outlet branch passages for guiding measures of lubricating fluid for discharge from said distributor to said outlet branch lines, one-way flow imposing means on-stream with respect to said outlet branch lines, said one-way flow imposing means being located downstream with respect to main fluid supply passage and defining from themselves to said main fluid supply passage an on-stream conduit volume which does not exceed the greatest total volume that occurs for any one of said outlet branch passages of the distributor together with any on-stream conduits associated therewith upstream thereof and downstream of the main fluid supply passage, and said one-way flow imposing means being thus located both on-stream and remotely upstream with respect to stations which are remote from said lubricant distributor, so that backflow into the distributor from the outlet branch lines is substantially eliminated, one of said cap blocks having a first cap block face for positioning against the said first face of one terminal one of said valve blocks, first and second piston chamber in-out ports in said first cap block face and having the same register as do said third and fourth piston chamber in-out ports respectively on each of said valve blocks, the other of said cap blocks having a second cap block face for positioning against the said second face of the other terminal one of said valve blocks, first and second piston chamber in-out ports in said second cap block face and having the same register as do said first and second piston chamber in-out ports respectively on each of said valve blocks, passage means for joining said first piston chamber in-out port in said first cap block face to said second piston chamber in-out port in said second cap block face and for joining said second piston chamber in-out port in said first cap block face to said first piston chamber in-out port in said second cap block face.

3. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a fluid supply header for receiving lubricant from said supply source, outlet branch lines leading out of said distributor and communicating with said several stations, said distributor comprising a plurality of valve-and-plunger units, each unit having first and second hydraulic piston chambers and a pair of hydraulic pistons each in its own one of said pair of chambers in lubricant sealing sliding relationship with its said own one of said pair of chambers, each said unit including linkage means for linking its said pair of hydraulic pistons for movement together and in hydraulic opposition to each other back and forth between first and second limiting end positions, each said unit also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said unit having first, second, third, fourth and fifth passages communicating with its said first, second, third, fourth and fifth valve ports, respectively, first and second in-out lines in each said unit communicating with said first and second piston chambers, respectively, said third and fourth passages constituting the upstream portions of said outlet branch passages for guiding measures of lubricating fluid for discharge from said distributor to said outlet branch lines, a fluid-supply header communicating with each of and branching into said fifth passages, each of the pairs of passages comprising said first and second passages of each unit being connected with its own pair of in-out lines comprising said first and second in-out lines of another unit, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately port their said first and second valve ports to their said fifth valve port when the one of their said first and second piston chambers closest to their said first and second valve ports is filled, any remaining number of said valve means being oppositely arranged, the total of said remaining numbers of connected pairs and valve means equalling an odd number, and one-way flow imposing means in each of said fifth passages.

4. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a main fluid supply passage for receiving lubricant from said supply source, outlet branch lines leading out of said distributor and communicating with said several stations, said distributor comprising a plurality of valve blocks and two cap blocks, each valve block having first and second hydraulic piston chambers and a pair of hydraulic pistons each in its own one of said pair of chambers in lubricant sealing sliding relationship with its said own one of said pair of chambers, each said valve block including linkage means for linking its said pair of hydraulic pistons for movement together and in hydraulic opposition to each other back and forth between first and second limiting end positions, each said valve block also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said valve block having first, second, third, fourth and fifth passages communicating with its said first, second, third, fourth and fifth valve ports, respectively, each said valve block having first and second opposite faces for positioning against adjacent blocks in said lubricant distributor, first and second piston chamber in-out ports and a first main fluid supply port on said first face, third and fourth piston chamber in-out ports and a second main fluid supply port on said second face, a main fluid supply passage in said each valve block joining said first and second main fluid supply ports, said third piston chamber in-out port of said each valve block communicating with said first piston chamber and being in register with an imaginary projection of said first piston chamber in-out port onto said second face, said fourth piston chamber in-out port of said each valve block communicating with said second piston chamber and being in register with an imaginary projection of said second piston chamber in-out port onto said second face, said first and second passages of said each valve block communicating with the said first and second piston chamber in-out ports respectively of said each valve block, said fifth valve port communicating with said main fluid supply passage, said third and fourth passages constituting the upstream portion of outlet branch passages for guiding measures of lubricating fluid for discharge from said distributor to said outlet branch lines, one-way flow imposing means in said fifth passage of each said valve block, one of said cap blocks having a first cap block face for positioning against the said first face of one terminal one of said valve blocks, first and second piston chamber in-out ports in said first cap block face and having the same register as do said third and fourth piston chamber in-out ports respectively on each of said valve blocks, the other of said cap blocks having a second cap block face for positioning against the said second face of the other terminal one of said valve blocks, first and second piston chamber in-out ports in said second cap block face and having the same register as do said first and second piston chamber in-out ports respectively on each of said valve blocks, passage means for introducing fluid to said main fluid supply passages and additional passage means for joining said first piston chamber in-out port in said first cap block face to said second piston chamber in-out port in said second cap block face and for joining said second piston chamber in-out port in said first cap block face to said first piston chamber in-out port in said second cap block face.

5. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a main fluid supply passage for receiving lubricant from said supply source, outlet branch lines leading out of said distributor and communicating with said several stations, said distributor comprising a plurality of valve blocks, each valve block having first and second hydraulic piston chambers and a pair of hydraulic pistons each in its own one of said pair of chambers in lubricant sealing sliding relationship with its said own one of said pair of chambers, each said valve block including linkage means for linking its said pair of hydraulic pistons for movement together and in hydraulic opposition to each other back and forth between first and second limiting end positions, each said valve block also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said valve block having first, second, third and fourth passages communicating with its said first, second, third and fourth valve ports, respectively, each said valve block having first and second opposite faces for positioning against adjacent blocks in said lubricant distributor, first and second piston chamber in-out ports and a first main fluid supply port on said first face, third and fourth piston chamber in-out ports and a second main fluid supply port on said second face, a main fluid supply passage in said each valve block joining said first and second main fluid supply ports, an in-out line connecting said third piston chamber in-out port of said each valve block with said first piston chamber, said third piston chamber in-out port of each valve block being in register with an imaginary projection of said first piston chamber in-out port onto said second face, an in-out line connecting said fourth piston chamber in-out port of said each valve block with said second piston chamber, said fourth piston chamber in-out port of each valve block being in register with an imaginary projection of said second piston chamber in-out port onto said second face, said first and second passages of said each valve block communicating with the said first and second piston chamber in-out ports respectively of said each valve block, said fifth valve port communicating with said main fluid supply passage, said third and fourth passages constituting the upstream portions of outlet branch passages for guiding measures of lubricating fluid for discharge from said distributor to said outlet branch lines, one-way flow imposing means on-stream with respect to said outlet branch lines, said one-way flow imposing means being located downstream with respect to main fluid supply passage and defining from themselves to said main fluid supply passage an on-stream conduit volume which does not exceed the greatest total volume that occurs for any one of said outlet branch passages of the distributor together with any on-stream conduits associated therewith upstream thereof and downstream of the main fluid supply passage, and said one-way flow imposing means being thus located both on-stream and remotely upstream with respect to stations which are remote from said lubricant distributor, so that backflow into the distributor from the outlet branch lines is substantially eliminated, additional passages within said distributor for connecting said first and second passages of an endmost valve block with the pair of in-out lines of the other endmost valve block, each of the pairs of passages comprising said first and second passages of each valve block being connected with its own pair of in-out lines comprising said first and second in-out lines of another valve block, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve ports to their said fifth valve port when the one of their said first and second piston chambers closest to their said first and second valve ports is filled, any remaining number of said valve means being oppositely arranged, the total of said remaining numbers of connected pairs and valve means equalling an odd number.

6. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a main fluid supply passage for receiving lubricant from said supply source, outlet branch lines leading out of said distributor and communicating with said several stations, said distributor comprising a plurality of valve blocks, each valve block having first and second hydraulic piston chambers and a pair of hydraulic pistons each in its own one of said pair of chambers in lubricant sealing sliding relationship with its said own one of said pair of chambers, each said valve block including linkage means for linking its said pair of hydraulic pistons for movement together and in hydraulic opposition to each other back and forth between first and second limiting end positions, each said valve block also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said valve block having first, second, third, fourth and fifth passages communicating with its said first, second, third, fourth and fifth valve ports, respectively, each said valve block having first and second opposite faces for positioning against adjacent blocks in said lubricant distributor, first and second piston chamber in-out ports and a first main fluid supply port on said first face, third and fourth piston chamber in-out ports and a second main fluid supply port on said second face, a main fluid supply passage in said each valve block joining said first and second main fluid supply ports, an in-out line connecting said third piston chamber in-out port of said each valve block with said first piston chamber, said third piston chamber in-out port of said each valve block being in register with an imaginary projection of said first piston chamber in-out port onto said second face, an in-out line connecting said fourth piston chamber in-out port of said each valve block with said second piston chamber, said fourth piston chamber in-out port of said each valve block being in register with an imaginary projection of said second piston chamber in-out port onto said second face, said first and second passages of said each valve block communicating with the said first and second piston chamber in-out ports respectively of said each valve block, said fifth valve port communicating with said main fluid supply passage, said third and fourth passages constituting the upstream portion of outlet branch passages for guiding measures of lubricating fluid for discharge from said distributor to said outlet branch lines, one-way flow imposing means in said fifth passage of each said valve block, additional passages within said distributor for connecting said first and second passages of an endmost valve block with the pair of in-out lines of the other endmost valve block, each of the pairs of passages comprising said first and second passages of each valve block being connected with its own pair of in-out lines comprising said first and second in-out lines of another valve block, with a given number of the connected pairs of such passages and in-out lines having said first passages connected to said first in-out lines and said second passages connected to said second in-out lines and any remaining number of said connected pairs of such passages and in-out lines being connected in the opposite manner, a given number of said valve means being formed to alternately connect their said first and second valve ports to their said fifth valve port when the one of their said first and second piston chambers closest to their said first and second valve ports is filled, any remaining number of said valve means being oppositely arranged, the total of said remaining numbers of connected pairs and valve means equalling an odd number.

7. A lubricating system for supplying lubricant to several stations and proportioning the supplied lubricant between the several stations from a supply source which supplies lubricant to the system against varying back pressure so long as the back pressure does not exceed a maximum, comprising a cycling lubricant distributor having a fluid supply header for receiving lubricant from said supply source, outlet branch lines leading out of said distributor and communicating with said several stations, said distributor comprising a plurality of valve-and-plunger units, each unit having first and second hydraulic piston chambers and a pair of hydraulic pistons each in its own one of said pair of chambers in lubricant sealing sliding relationship with its said own one of said pair of chambers, each said unit including linkage means for linking its said pair of hydraulc pistons for movement together and in hydraulic opposition to each other back and forth between first and second limiting end positions, each said unit also including valve means associated for movement with said linkage means, first, second, third, fourth and fifth valve ports associated with each of said valve means, said first and fifth valve ports being interconnected and said second and fourth valve ports being interconnected when said first limiting end position obtains but not when said second limiting end position obtains, and said first and third valve ports being interconnected and said second and fifth valve ports being interconnected when said second limiting end position obtains but not when said first limiting end position obtains, each said unit having first, second, third, fourth and fifth passages communicating with its said first, second, third, fourth and fifth valve ports, respectively, first and second in-out lines in each said unit communicating with said first and second piston chambers, respectively, said third and fourth passages constituting the upstream portions of said outlet branch passages for guiding measures of lubricating fluid for discharge from said distributor to said outlet branch lines, a fluid-supply header communicating with each of and branching into said fifth passages, each of the pairs of passages comprising said first and second passages of each unit being connected with its own pair of in-out lines comprising said first and second in-out lines of another unit having first, second, third, fourth and fifth passages passages and in-out lines having said first passages connected to said first in-out lines and said second passages connected to said second in-out lines and any remaining number of said connected pairs of such passages and in-out lines being connected in the opposite manner, a given number of said valve means being formed to alternately port their said first and second valve ports to their said fifth valve port when the one of their said first and second piston chambers closest to their said first and second valve ports is filled, any remaining number of said valve means being oppositely arranged, the total of said remaining numbers of connected pairs and valve means equalling an odd number, and one-way flow imposing means in at least some of said fifth passages.

References Cited in the file of this patent
UNITED STATES PATENTS

| | | |
|---|---|---|
| 2,146,424 | Dirkes | Feb. 7, 1939 |
| 2,300,330 | Acker | Oct. 27, 1942 |
| 2,308,865 | Davis | Jan. 19, 1943 |
| 2,719,603 | Le Clair | Oct. 4, 1955 |
| 2,742,978 | Peterson et al. | Apr. 24, 1956 |
| 2,792,911 | Harter | May 21, 1957 |

UNITED STATES PATENT OFFICE
CERTIFICATE OF CORRECTION

Patent No. 3,074,509                  January 22, 1963

Norman S. Robson

It is hereby certified that error appears in the above numbered patent requiring correction and that the said Letters Patent should read as corrected below.

Column 10, line 47, for "34b" read -- 43b --; column 12, line 8, for "exmaple" read -- example --; column 13, line 58, after "with" insert -- the --; column 15, lines 42 and 43, strike out "and said second and fourth valve ports being interconnected"; line 49, after "fourth" insert -- passages communicating with its said first, second, third and fourth --; column 21, line 7, strike out "having first, second, third, fourth and fifth passages" and insert instead --,with a given number of the connected pairs of such --.

Signed and sealed this 27th day of August 1963.

(SEAL)
Attest:

ERNEST W. SWIDER                          DAVID L. LADD
Attesting Officer                            Commissioner of Patents